Figure 1:
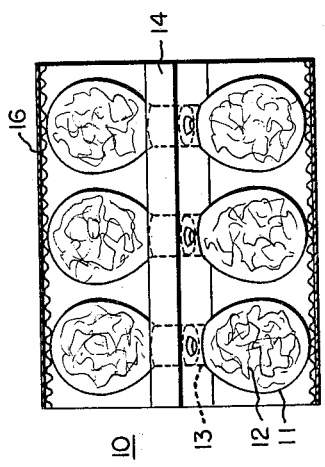

Dec. 11, 1962   R. G. PETTS ETAL   3,067,873
DETECTOR DEVICE
Filed Feb. 9, 1959   2 Sheets-Sheet 1

INVENTORS
RONALD G. PETTS
HAROLD L. SWARTZ
BY
KENWAY, JENNEY, WITTER & HILDRETH
ATTORNEYS

Dec. 11, 1962    R. G. PETTS ETAL    3,067,873
DETECTOR DEVICE
Filed Feb. 9, 1959    2 Sheets-Sheet 2

INVENTORS
RONALD G. PETTS
HAROLD L. SWARTZ
BY
KENWAY, JENNEY, WITTER & HILDRETH
ATTORNEYS

United States Patent Office 3,067,873
Patented Dec. 11, 1962

3,067,873
DETECTOR DEVICE
Ronald G. Petts, Williamsport, and Harold L. Swartz, Linden, Pa., assignors, by mesne assignments, to Sylvania Electric Products Inc., Wilmington, Del., a corporation of Delaware
Filed Feb. 9, 1959, Ser. No. 792,209
1 Claim. (Cl. 209—81)

This invention relates in general to detection apparatus and in particular to a device for analyzing the contents of a package to detect missing or fired lamps.

It was originally the practice to examine lamps visually to make certain that no package or packing sleeve should contain fired lamps or less than the full number of lamps. Another alternative has been an inspection by means of lights and photocells, the variations of reflectivity caused by no lamp or the consumed fill of a fired lamp as compared to a good lamp providing the basic difference on which the detection was possible.

The difficulties with manual inspection are obvious. Cost and handling are objectionable and, furthermore, the inspection had to be made before the lamps were packed in their containing sleeves. This last objection was also applicable to the reflectivity type of measurement. Opening packages to make the inspection in either of the alternative methods is also most undesirable.

It is with the solution to these problems in detention or inspection that the present invention is concerned. Broadly defined, the invention involves a sensing circuit for noting the presence or absence of flash bulb foil in each bulb and a photoelectric control and memory system for controlling the operation of said sensing circuit and of an accept-reject circuit for rejecting packages in which the tuned circuit has detected missing or fired bulbs.

A general object of the invention is the completely automatic final inspection of packaged lamps.

Another general object is the improvement of inspection efficiency.

It is another object of the invention to automatically detect missing or flashed lamps within an enclosing package.

It is yet another object of this invention to accept or reject packages of lamps according to the condition of their contents.

Still another object of the invention is to insure that all packages of lamps shipped will be full of good lamps.

Still another object is to automatically sort defective packages from acceptable packages.

One feature of the invention entails a pair of disk probes which are roughly the diameter of an individual flash lamp bulb and are spaced from one another across a conveyor. The probes are associated with a tuned circuit whose operation depends upon the presence or absence of foil in an individual bulb. Should a bulb be entirely missing or should a bulb be flashed so that the foil has vaporized, a signal will be produced which is ultimately used to eject the entire package containing the defect.

Another feature of the invention lies in a photoelectric relay memory system which notes the position of a package in the inspection area. This system operates in cooperation with the disk probes to make certain that the particular package containing a flashed lamp or insufficient lamps is segregated from acceptable packages.

Figure 2:
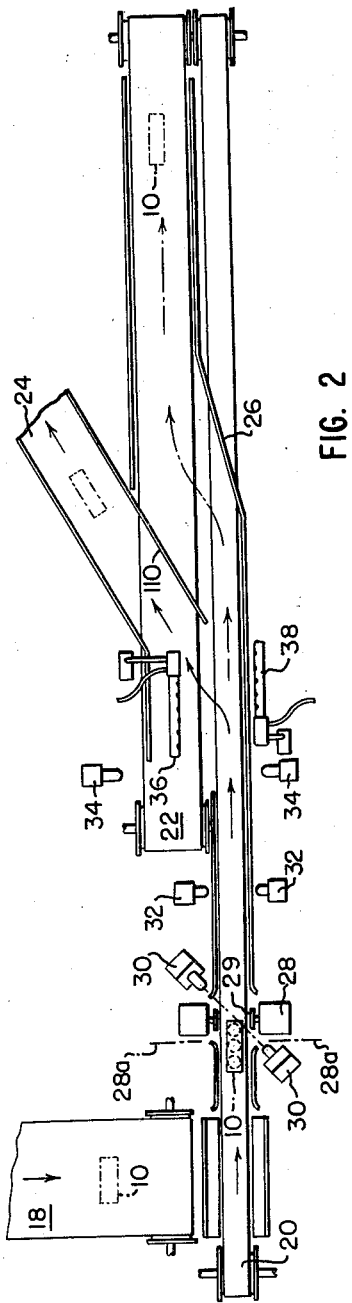
Figure 3:
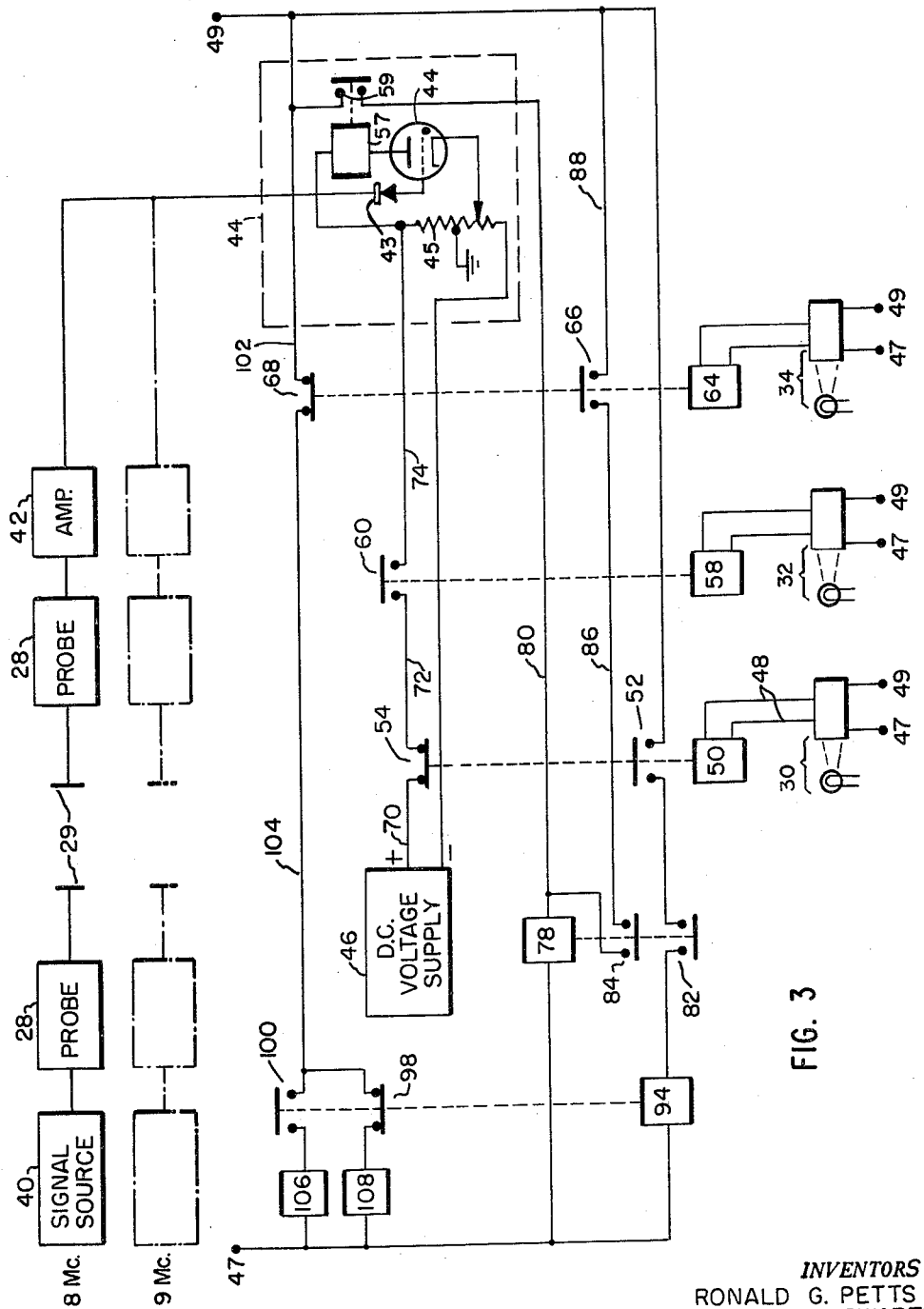

These and other features and objects will more readily appear from a detailed discussion of a preferred embodiment of the invention in which:

FIG. 1 is a sectional view in elevation showing a package of flash bulbs, typical of those inspected by the apparatus of the invention, FIG. 2 is a plan view of a conveyor system illustrating an arrangement of probes, photocells and reject apparatus made in accordance with the invention, and FIG. 3 is a schematic diagram of a circuit useful in the invention.

In the drawings the reference character 10 indicates a package or sleeve of six flash lamps of conventional size and shape. Although these sleeves usually contain twelve lamps, only six are shown in the illustrated sleeve for simplicity. Each lamp includes a roughly spherical glass bulb 11 containing a quantity of foil 12 and a base 13 is cemented to the bulb. The lamps are in two rows supported by their bases on opposite sides of a length of cardboard tubing 14, which is usually rectangular in cross section. The sleeve 16 also rectangular in cross section and usually made of corrugated paper encases the group of bulbs. The lamps are mounted fairly close to one another with relatively little space between adjacent bulbs 11. The interval between bulbs is considerably less than the bulb diameter and this is of some significance in the present invention which will become more apparent in the description of the inspection apparatus which follows.

In FIG. 2 several sleeves 10 are shown at various locations along a conveyor system with arrows indicating the paths of the sleeves. A conveyor 18 feeds the packages 10 onto what may be characterized as an inspection conveyor 20 which may run at right angles to the conveyor 18. The sleeves will travel along the conveyor 20 in an upright position, such that one row of lamps is above the other, and the sleeve moves lengthwise presenting pairs of bulbs successively to any given point along the conveyor 20.

A removal conveyor 22 runs parallel to the inspection conveyor 20 and serves to feed sleeves containing defective bulbs or lacking a full complement of bulbs into a reject chute 24. Conversely, sleeves containing a full complement of good bulbs are channeled onto the removal conveyor 22 at a point beyond the reject chute by means of a guide rail 26.

Positioned on either side of the inspection conveyor 20 adjacent the conveyor 18 are two pairs or sets of probe boxes 28 and 28a. The set 28 is mounted on top of the set 28a, and each is provided with disk probes 29 of approximately the same diameter as the bulb 11. A set of probes is needed for each of the two rows of lamps in each sleeve, previously noted as being so oriented that one row is above the other as the sleeve travels along the conveyor 20.

In FIG. 2 three pairs of lamp-photoelectric cell combinations are shown arranged alongside the conveyor 20. The first of these in order of operation and at the left of the drawing is photocell combination 30. The lamp and cell are so disposed that the light beam from the lamp crosses the conveyor at an angle to the conveyor's longitudinal axis. The leading edge of a sleeve 10 interrupts the light beam just as the first bulb 11 approaches exact alignment with the probe disks 29; the spacing between the beam and the probe disks being properly related to the dimensions of the sleeve and first bulb location therein. Breaking of the light beam conditions the inspection circuit to begin checking the presence of, or defects in, the first bulb.

The sleeve continues along the conveyor and its leading edge breaks the light beam between the second lamp-photocell combination 32 just as the last bulb passes out of register with its associated probes. The second lamp-photocell 32 causes the inspection circuit to be turned off. Such shutdown is necessary because if no sleeve of bulbs is between the probes, a reject signal is automatically produced. By the means described, it is assured that the inspection circuit will not be rendered operative again until another sleeve arrives in the inspection area.

As the sleeve 10 progresses further along the conveyor, it passes between a third lamp-photocell combination 34 which operates a pair of oppositely mounted air blast manifolds 36 and 38. Assuming that a defective or missing bulb had been sensed by the probes the "reject" manifold 38 would be actuated as soon as the light beam to photocell 34 is broken. The blast of air from the manifold 38 will blow the defective sleeve from the conveyor 20 to the removal conveyor 22, from whence it is guided into the reject chute 24. Assuming the sleeve to have a complete set of good lamps, the "accept" manifold 36 is actuated and directs air against the sleeve to hold it on the conveyor 20 until it passes the reject chute 24.

FIG. 3 is a simplified diagram of a circuit suitable to operate the apparatus. To avoid duplication of explanation and illustration, only one probe system will be described although it is understood that in practice two systems are used, one for each row of bulbs. Both systems have similar operation, differing only in frequency so that there will be no interference between sets of probes during operation.

As a signal source, an oscillating circuit having feedback phasing and crystal control to minimize frequency drift may be used. The output of the signal source 40 is fed to the input probe box 28 which includes a tunable resonant circuit to the high or ungrounded side of which one probe disk 29 is connected. The other probe disk 29 is connected to an identical resonant circuit in the output probe box.

The output probe box 28 is connected to an amplifier 42, the output of which is rectified by a rectifier 43 and utilized as the negative control voltage on the grid of a control thyratron in the unit 44. Voltage in the plate or output circuit of the thyratron is desirably made adjustable by means of a tapped voltage divider 45 or similar device in the unit 44 connected to the cathode of the thyratron. This constitutes a thyratron level control to set the firing point of the thyratron in respect to the amount of control signal being applied to the grid. The portion of the circuit so far described, with the exception of the thyratron plate circuit, is normally energized, and coupling exists between the probes, regardless of the position of the sleeve.

The application of plate voltage to the thyratron is controlled by photocell-lamp combination disposed adjacent the conveyor. Only when a sleeve 10 breaks the appropriate light beam as lamps are disposed between the probe disks is thyratron plate voltage applied.

In the foregoing broad description of the circuit no mention has been made of the numerous relay coils and contacts and interconnecting leads that are illustrated in FIG. 3, but their function and interrelation will be more clearly understood by a reading of the following detailed description of the operation of the illustrated embodiment of the invention.

The lower portion of FIG. 3 illustrates schematically the circuit in a deenergized condition. Once the power leads 47 and 49 are energized, contacts 52 and 54, 60, 66 and 68, associated with the photocells 30, 32 and 34 respectively, are reversed by virtue of current flow through the relay coils 50, 58 and 64.

Let it be assumed that the circuit is now energized and a sleeve 10 having a missing or defective lamp is moving along the conveyor 20 towards the inspection area. The leading edge of the sleeve breaks the light beam of the photocell 30 just as the first bulb in the sleeve becomes aligned with the probe disks 29. Interruption of the beam to the photocell 30 de-energizes the relay coil 50 through a pair of leads 48. The relay contacts 52 are opened and at the same time the contacts 54 are closed by the action of the relay coil 50.

Since the contacts 60 associated with the second photocell 32 were closed with the application of power, a circuit is made from the positive side of the D.C. voltage supply 46 by way of leads 70, 72 and 74 to the plate of the thyratron in the unit 44. The grid of the thyratron is biased against conduction by a negative control voltage derived from the rectified output of the amplifier 42.

As soon as a missing or defective bulb appears between the probe disks 29, the absence of foil reduces the coupling between the disks. As a result, less negative control voltage is developed and the decreased negative voltage on the grid causes the thyratron to fire. A relay coil 78 is energized through a solenoid 57 connected in series with the thyratron plate and cathode as plate current flows, causing contacts 59 to close. Closing of the contacts 59 and the accompanying flow of current through the relay coil 78 causes the contacts 82 and 84 to close. The contacts 66 associated with the third photocell 34 were closed at the original application of power to the circuit; hence, relay coil 78 is now placed directly across the power lines 47 and 49 through a lead 80, its own contacts 84, lead 86, contacts 66 and lead 88. This circuit is in shunt with the thyratron circuit and relay coil 78 remains energized independent of continued conduction in the thyratron.

The leading edge of the sleeve moves into the beam of the second photocell 32 just as the last lamp in the sleeve passes out from between the probes. The interruption of the beam causes de-energization of the coil 58 through the leads 56 and the contacts 60 are reopened. Plate volage to the thyratron is thus removed, and sensing action by the probes ceases until a new sleeve or package comes into the inspection area on the conveyor.

As the original sleeve moves entirely out of the beam of the first photocell 30, the photocell 30 becomes reenergized, and current once more flows in the relay coil 50. The contacts 52 close, and the contacts 54 open. With the closing of contacts 52, a circuit is established through the previously closed contacts 82 and a time delay relay coil 94. The time delay relay 94, upon being energized, closes the "reject" contacts 100 and opens the "accept" contacts 98. The circuit is now conditioned to reject the sleeve containing a defective bulb or lacking a full complement of bulbs when it arrives between the air blast manifolds 36 and 38.

The sleeve continues along the conveyor and passes out of the beam of the second photocell 32. With the beam re-established, the relay coil 58 is again energized. The contacts 60 then close, leaving it necessary only for the beam of the first photocell 30 to be interrupted by a new sleeve for plate voltage to be applied again to the thyratron and sensing action to recommence.

As the sleeve passes into and interrupts the beam of the third photocell 34, the coil 64 becomes de-energized. Now the contacts 66 open, breaking the holding circuit through the relay coil 78. Simultaneously, the contacts 68 close and the solenoid 106 is energized through the leads 102 and 104 and the previously closed contacts 100 to admit air through an air valve (not shown) to the "reject" manifold 38.

Had the package or sleeve contained a full set of good lamps, the thyratron in the unit 44 would not have fired and the normally closed "accept" contacts 98 would not have opened. The sleeve when it passed into the beam of the third photocell 34 would have caused an "accept" solenoid 108 to be energized which in turn would open a valve to admit air to the manifold 36. The stream of air from the manifold 36 retains the accepted sleeve on the conveyor 20 until it passes beyond the guide 110. Once past this point, the sleeve is directed by the guide rail 26 onto the removal conveyor 22 for shipping.

The advantages of the above described apparatus will be readily apparent to those skilled in the art. Sleeves containing insufficient or defective lamps can now be automatically detected and sorted without interruption or delay. Production is in no way impeded and only sleeves having a full complement of good lamps are shipped.

Many modifications and substitutions of equivalents may be made without departing from the spirit of the invention. For instance, instead of the air blast manifold, push rods, moving gates, or other convenient means may be used to segregate rejected and accepted sleeves. Other and further modifications within the purview of the present invention will also suggest themselves to those skilled in the art.

Having thus described and illustrated a preferred embodiment of our invention, what we claim as new and desire to secure by Letters Patent of the United States is:

Apparatus for detecting the condition of packaged articles comprising means for generating an electrical signal, a first resonant circuit into which said signal is fed, a second resonant circuit normally uncoupled to the first, a pair of coupling elements for coupling said circuits together when one of said packaged articles passes between said elements, means for transferring said signal between said coupling elements, means for passing said packaged articles between said coupling elements, means for detecting variations in the coupling of said signal between said pair of coupling elements caused by varying conditions of said articles passing therebetween, means for storing information on said variations in coupling, and means responsive to said information-storing means for segregating said packaged articles into groups at a point beyond said pair of coupling elements.

References Cited in the file of this patent

UNITED STATES PATENTS

| | | |
|---|---|---|
| 2,101,381 | Appleyard | Dec. 7, 1937 |
| 2,280,948 | Gulliksen | Apr. 28, 1942 |
| 2,444,751 | Scott | July 6, 1948 |
| 2,448,814 | Mann | Sept. 7, 1948 |
| 2,566,767 | Hunt | Sept. 4, 1951 |
| 2,570,288 | Todd | Oct. 9, 1951 |
| 2,635,747 | Hughes | Apr. 21, 1953 |
| 2,734,628 | Schlayer | Feb. 14, 1956 |
| 2,803,341 | Schneider | Aug. 20, 1957 |

FOREIGN PATENTS

| | | |
|---|---|---|
| 484,109 | Great Britain | May 2, 1938 |